Figure 1:
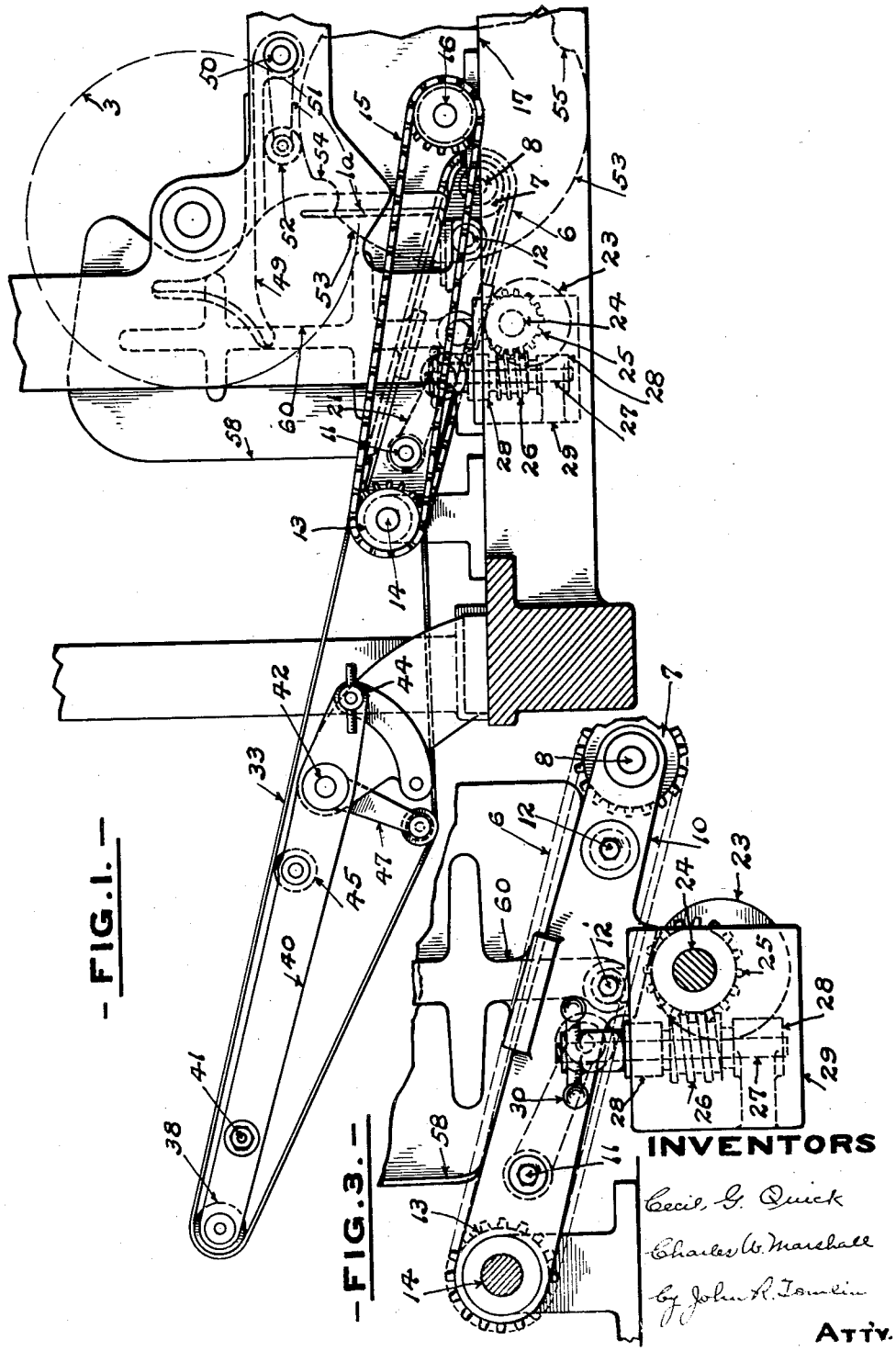

Sept. 4, 1934.   C. G. QUICK ET AL   1,972,460
DELIVERY MECHANISM FOR USE IN PRINTING MACHINES
Filed Oct. 13, 1930   2 Sheets-Sheet 1

INVENTORS
Cecil G. Quick
Charles W. Marshall
by John R. Tomlin
ATTY.

Sept. 4, 1934.    C. G. QUICK ET AL    1,972,460
DELIVERY MECHANISM FOR USE IN PRINTING MACHINES
Filed Oct. 13, 1930    2 Sheets-Sheet 2

INVENTORS.
Cecil G. Quick
Charles W. Marshall
By John R. Tomlin
ATTY.

Patented Sept. 4, 1934

1,972,460

UNITED STATES PATENT OFFICE 1,972,460

DELIVERY MECHANISM FOR USE IN PRINTING MACHINES

Cecil George Quick, Eltham, London, and Charles William Marshall, Brixton, London, England, assignors to R. Hoe & Co., Inc., New York, N. Y., a corporation of New York; Irving Trust Company, receiver Application October 13, 1930, Serial No. 488,394
In Great Britain May 22, 1930

7 Claims. (Cl. 271—80)

This invention relates to improvements in delivery mechanism for use in printing machines, and more particularly to the conveyor belts, chains or the like, to which the products are delivered by the delivery devices commonly referred to as "flies".

The conveyor has hitherto usually been mounted in fixed frames and has been positioned at that distance below the fly which is most efficient for the thickness of product which the machine is primarily intended to deliver. When, as is usual under modern conditions, the machine is required to deliver products of different thicknesses, for instance, a twenty page morning newspaper, and an eight page mid-day paper, the setting of the conveyor, if correct for the twenty page product, is incorrect for the most efficient handling of the eight page product or vice versa.

While in some cases the products are taken by hand from the conveyor, in other cases they are taken by a second conveyor running at a higher speed, which spreads the products to enable them to pass between parallel endless conveyor wires or the like, delivering the products direct to the packing department. Here again, if the first conveyor be positioned below the fly at the distance most suitable for co-operation with the high speed conveyor, then should the high speed conveyor break down, hand collection becomes necessary and the setting of the first conveyor with respect to the fly will not be that most suitable for hand collection. Finally, when a high speed conveyor is used, the method usually employed to count the products by ejecting one copy in, say a quire, further than the others, becomes unreliable on account of the spreading out of the whole of the products.

The main object of the present invention is to provide a conveyor which can be adapted for the most efficient co-operation with the fly, whatever be the thickness of the product to be delivered, and whether the products be taken by high speed conveyor or by hand.

According to one feature of the present invention, there is provided means for adjusting the position of a conveyor device with respect to a delivery fly or other delivery device which delivers the products to the conveyor device.

Preferably the arrangement is such that the adjustment can be effected while the machine is running.

In the preferred construction, the conveyor comprises belts or chains which pass over pulleys or chain wheels mounted on a frame movable towards and away from the fly with which it co-operates, and an eccentric or the like is provided for adjusting the position of the frame and hence of the belts or chains with respect to the fly.

According to a further feature of the invention, in order to enable a "count" to be made when the products are taken by a high speed conveyor, there is provided means for causing the "count" copy to be displaced at an angle with respect to other copies in the count. Thus, even though the products are spread out by the high speed conveyor, the count copy is readily observed on account of its angular displacement.

Figure 2:
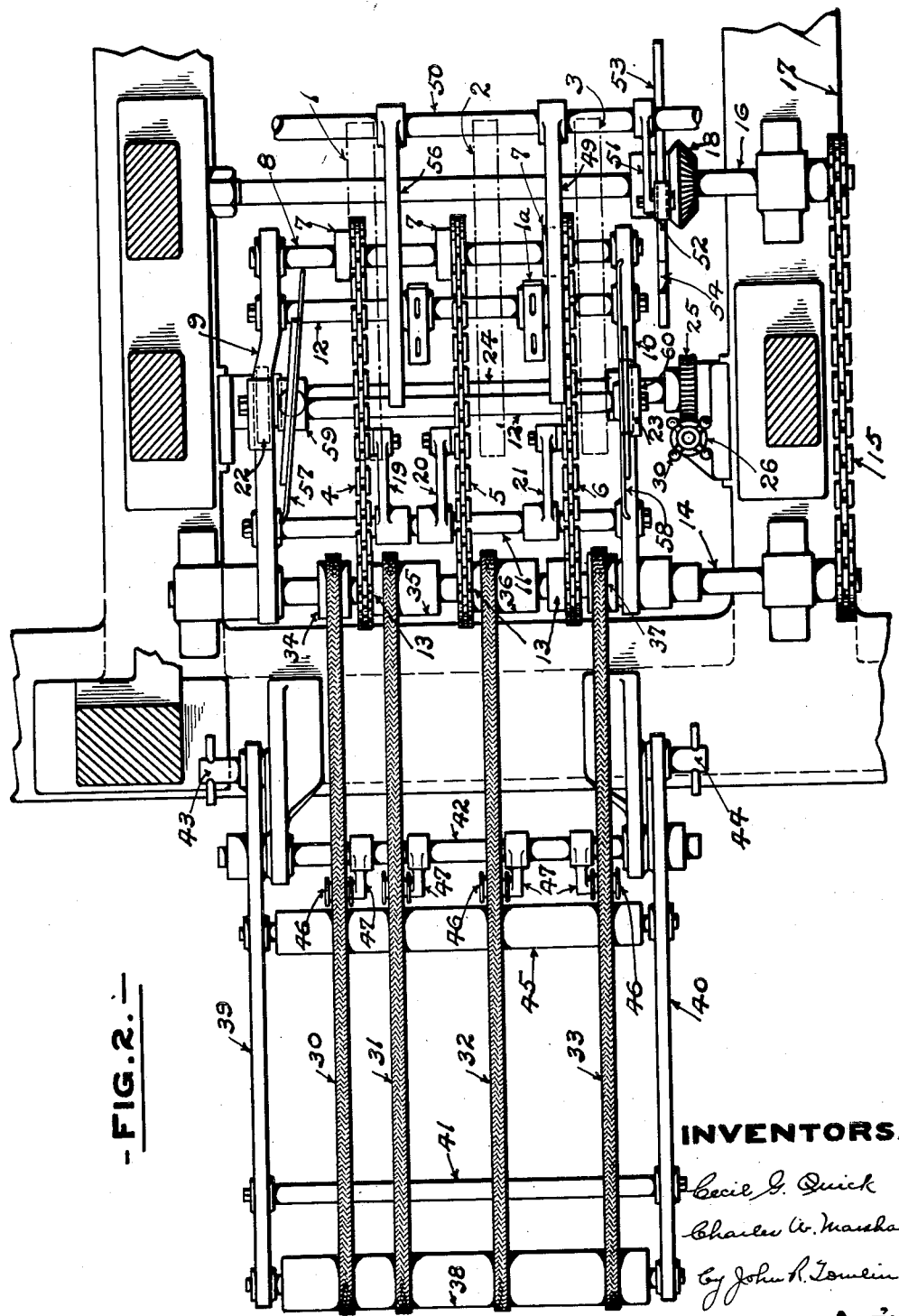

The invention is illustrated in the accompanying drawings, in which Figure 1 is a side elevation, Figure 2 a plan, and Figure 3 a detail view to a larger scale.

1, 2, 3 are delivery flies or fan wheels of conventional form comprising, as is usual, a series of curved arms between which the products are fed, and from which the products are ejected by ejector plates 1a. 4, 5, 6 are conveyor chains on which the fly lays the products in its rotation, and which pass at one end over chain wheels 7 mounted on a shaft 8 carried in a frame comprising side members 9, 10 and cross members 11, 12', 12, which latter carries the ejector plates 1a. The chains also pass over chain wheels 13 secured to a shaft 14 on which the frame is pivotally mounted, and with which is fast a chain wheel around which passes a chain 15 driven by a chain wheel fast with a shaft 16 journalled in the machine frame 17 and driven through bevel or like gearing from the fly drive, one wheel of the gearing being indicated at 18 (Figure 2).

Mounted on the cross member 11 are arms 19, 20, 21, carrying gear wheels which tension the chains 4, 5, and 6. The side members 9, 10 of the frame rest on eccentrics 22, 23 fast on a shaft 24 to which is secured a worm wheel 25 in mesh with a worm 26 secured to a spindle 27 mounted in bearings 28 on a plate 29 secured to the main frame 17, the spindle 27 being provided with an actuating hand-wheel 30 and the worm and worm wheel being self-locking.

The products pass from the chains to endless belts 30, 31, 32, 33 which pass over pulleys 34, 35, 36, 37 secured to the shaft 14 and over a roller 38 mounted at the outer end of a second frame, comprising side members 39 and 40 and a cross member 41 pivotally mounted on a cross shaft 42 and capable of being locked in or adjusted to various positions by clamping bolts 43, 44. The belts also pass over an intermediate roller 45, and over tensioning pulleys 46 mounted on arms 47 pivotally mounted on the cross shaft 42.

The products delivered to the belts 30—33 are either taken by a high speed conveyor which spreads the products out to enable them to pass between the wires of a third conveyor for delivering the products to the packing benches, or are collected by hand.

Thus it will be seen that by rotation of the spindle 27 the frame comprising members 9, 10, 11, 12 can be raised and allowed to be lowered by the eccentrics 22, 23, and thus the distance of the conveyor chains 4, 5, 6 with respect to the arms of the flies can be adjusted to suit the thickness of product which is to be delivered by the machine, and to suit the conditions which exist when the high speed conveyor or hand collection is employed. It will also be seen that the adjusting operation can be effected while the machine is running.

Furthermore, the chains 4, 5, 6 which, in the usual arrangements, are tensioned or pulled on their lower or non-delivery side, are, in the arrangement according to this invention, tensioned or pulled on their upper or delivery side, and thus any sag in the chains occurs on the non-delivery side where it is readily taken up by the tension device on the arms 19, 20, 21.

In order to enable a "count" of the products when they are taken by the high speed conveyor to be made, there is provided a kicker 49 which extends between the arms of two adjacent flies and is mounted on a cross shaft 50 to which is secured an arm 51 having a roller 52 in engagement with a disc 53. The disc is fast with the shaft 16 and is formed with two recesses 54, 55 which, when they register with the roller 52, allow the arm 51, and hence the ejector 49, to rock in an anti-clockwise direction; when so rocked, the ejector lies in the path of the products carried in the flies and hence ejects one copy diagonally or at an angle with respect to the adjoining copies. Thus, even though the products are afterwards spread out by the high speed conveyor, the count copy can still be observed on account of its angular position which will be preserved during the spreading out operation.

If for any reason, as for example, the break down of the high speed or wire conveyor, it is desired to collect the products by hand at the end of the conveyor belts 30—33, the single kicker can still be employed, but since the products are no longer spread out and an angular ejection of the count copy is not necessary, a second kicker 56 may be provided, which co-operates with the kicker 49 to eject one copy a further distance than but parallel with the adjoining copies, it being understood that this additional kicker would be removed or otherwise rendered inoperative when the high speed conveyor is employed.

In order to prevent derangement of the products by draughts, screens or shields 57, 58 may be provided, the screens being mounted on supports 59, 60. The support 60 is secured to the side member 10, and in order to enable the screen 57 to be adjusted according to whether the count copy is to be ejected angularly or parallel with respect to adjoining copies, the support 59 is formed at its lower end with a jaw which passes over the cross member 12' and can be clamped in any desired position thereon.

If desired, means may be provided for varying the speed at which the chains 4, 5, 6 are driven.

What we claim is:

1. In delivery mechanism for printing machines having a fan wheel delivery, the combination of a fan wheel, a conveyor assembly coactable with said fan wheel for receiving products from same, said conveyor assembly being adjustable relatively to the fan wheel for receiving products of various thicknesses, and means including self-locking instrumentalities for adjusting said conveyor assembly towards and away from said fan wheel.

2. In delivery mechanism for a printing machine having a fan wheel delivery, the combination of a fan wheel rotatably mounted on a fixed portion of said machine, a frame adjustably mounted on said machine, a plurality of rollers rotatably supported on said frame, an endless belt mounted on said rollers for travel thereover, and manually operable self-locking instrumentalities for securing said frame in desired position.

3. In delivery mechanism for printing machines having a fan wheel delivery, the combination of a rotatable fan wheel, a conveyor assembly including a frame pivotally mounted on said mechanism, said frame having endless traveling elements, means for taking up sag on the non-delivery side of said elements whereby the delivery side of the elements are tensioned, and cam-actuated means for moving the frame in a substantially vertical direction to change its position relatively to the fan wheel for accommodating products of various thicknesses.

4. In delivery mechanism for printing machines having a fan wheel delivery, a rotatable fan wheel secured in a fixed position on said mechanism, a conveyor assembly pivotally mounted on the mechanism, means including a cam and self-locking worm gearing for adjusting the conveyor assembly relatively to the fan wheel to accommodate products of various thicknesses, a second conveyor assembly mounted on said mechanism, and means for adjusting the second conveyor assembly in order to swing same out of operative position when desired.

5. In delivery mechanism for a printing machine having a fan wheel delivery, the combination of a fan wheel, a conveyor assembly movably mounted on the mechanism and coactable with the fan wheel for receiving products from same, and means including an eccentric and a frame forming a part of said conveyor assembly for adjusting the conveyor assembly towards and away from the fan wheel to accommodate products of various thicknesses.

6. A delivery mechanism as specified in claim 5 wherein instrumentalities are provided for locking the conveyor assembly in various operative positions.

7. A delivery mechanism as specified in claim 5 wherein a second conveyor assembly is mounted on the mechanism in coactable relation with the first mentioned conveyor assembly, said second conveyor assembly having instrumentalities for securing same in various positions.

CECIL GEORGE QUICK.
CHARLES WILLIAM MARSHALL.